(12) United States Patent
Lischinski et al.

(10) Patent No.: US 9,256,927 B2
(45) Date of Patent: Feb. 9, 2016

(54) METHOD AND APPARATUS FOR ENHANCING A DIGITAL PHOTOGRAPHIC IMAGE

(71) Applicant: Yissum Research Development Company of The Hebrew University of Jerusalem Ltd., Jerusalem (IL)

(72) Inventors: Daniel Lischinski, Jerusalem (IL); Michael Werman, Jerusalem (IL); Liad Kaufman, Ma'aleh-Adumim (IL)

(73) Assignee: Yissum Research Development Companyof The Hebrew University of Jerusalem Ltd., Jerusalem (IL)

( * ) Notice: Subject to any disclaimer, the term of this patent is extended or adjusted under 35 U.S.C. 154(b) by 392 days.

(21) Appl. No.: 13/936,273

(22) Filed: Jul. 8, 2013

(65) Prior Publication Data

US 2014/0010448 A1    Jan. 9, 2014

Related U.S. Application Data

(60) Provisional application No. 61/668,640, filed on Jul. 6, 2012.

(51) Int. Cl.
*G06T 5/00* (2006.01)
*G06T 5/40* (2006.01)

(52) U.S. Cl.
CPC ............... *G06T 5/005* (2013.01); *G06T 5/008* (2013.01); *G06T 5/40* (2013.01); *G06T 2207/10024* (2013.01); *G06T 2207/20076* (2013.01); *G06T 2207/30201* (2013.01)

(58) Field of Classification Search
USPC ...................................................... 382/254
See application file for complete search history.

(56) References Cited

U.S. PATENT DOCUMENTS

| | | | | |
|---|---|---|---|---|
| 7,003,153 | B1 * | 2/2006 | Kerofsky | G06T 5/009 348/E5.119 |
| 7,263,220 | B2 * | 8/2007 | Crandall | G06K 9/6212 382/165 |
| 7,460,707 | B2 * | 12/2008 | Nishi | G03B 27/735 358/3.26 |
| 7,796,827 | B2 * | 9/2010 | Lin | G06K 9/00234 348/207.2 |
| 8,204,329 | B2 * | 6/2012 | Zhang | G06T 5/008 382/254 |
| 8,374,425 | B2 * | 2/2013 | Naccari | G06K 9/38 382/165 |
| 2004/0218829 | A1 * | 11/2004 | Lee | H04N 1/6072 382/261 |
| 2008/0298704 | A1 * | 12/2008 | Nachlieli | G06T 5/003 382/254 |
| 2010/0080459 | A1 * | 4/2010 | Dai | G06T 5/009 382/170 |
| 2015/0091900 | A1 * | 4/2015 | Yang | G06T 5/006 345/419 |

* cited by examiner

*Primary Examiner* — Ishrat I Sherali
(74) *Attorney, Agent, or Firm* — Pearl Cohen Zedek Latzer Baratz LLP

(57) ABSTRACT

A method and apparatus for enhancing a digital photographic image uses a combination of global and content-specific operations. Image data is analyzed to detect one or more content items in the image to be separately enhanced. Then a content-specific enhancement operation is performed on data representing at least one detected content item, separately from the remainder of the image data. Several such content-specific operations may be performed for different types of content item. The content-specific enhancement operation comprises manipulating data, and the manipulation applies different adjustments to different pixels in the detected content item and the determination of the adjustments is based solely on analysis of the image data. Then a different enhancement operation is performed on at least the remaining image data excluding said one or more detected content items.

19 Claims, 9 Drawing Sheets

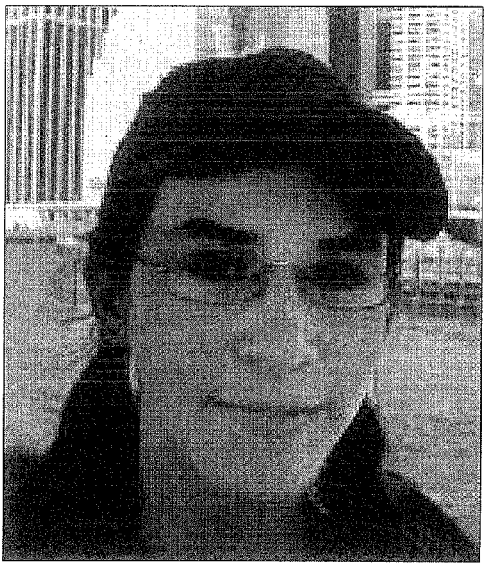
Figure 3

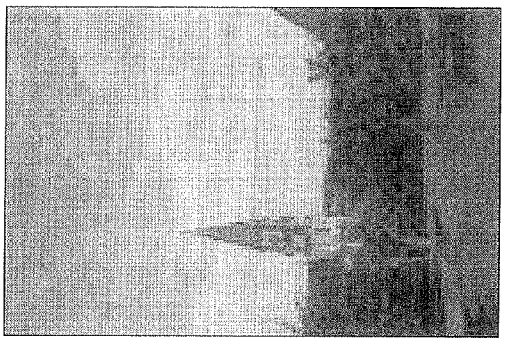
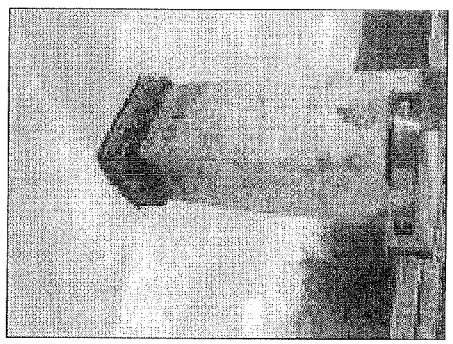
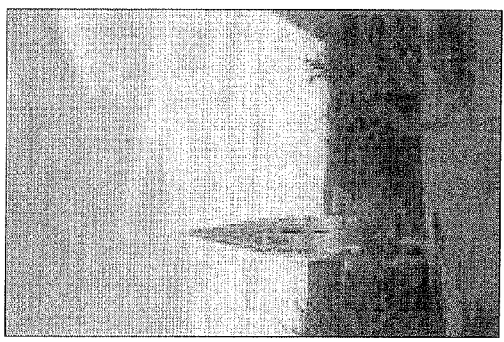
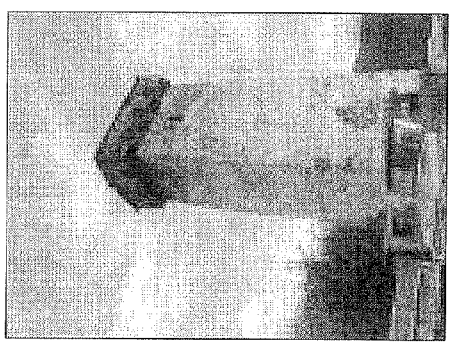
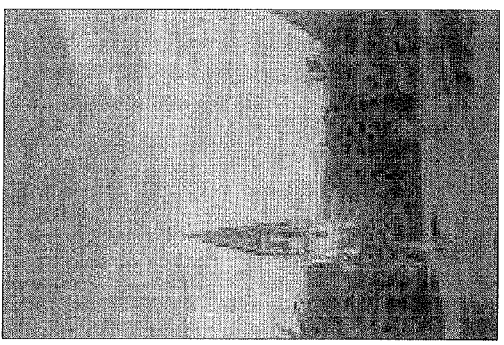
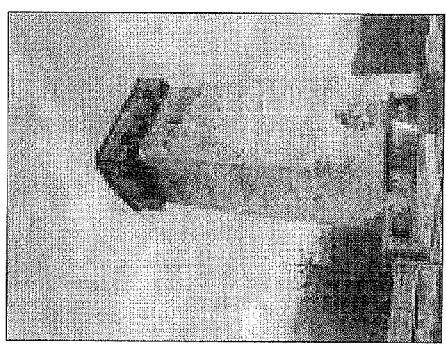
Figure 7

METHOD AND APPARATUS FOR ENHANCING A DIGITAL PHOTOGRAPHIC IMAGE

CROSS-REFERENCE TO RELATED APPLICATIONS

This application is a non-provisional patent application claiming priority from U.S. Provisional Patent Application No. 61/668,640, filed on Jul. 6, 2012, which is incorporated herein in its entirety.

FIELD OF THE INVENTION

The present invention relates to the automatic enhancement of digital photographic images.

Automatic photo enhancement is one of the longstanding goals in image processing and computational photography. While a variety of methods have been proposed for manipulating tone and color, most automatic methods used in practice, operate on the entire image without attempting to take the content of the image into account.

BACKGROUND OF THE INVENTION

The last decade has witnessed a dramatic growth in the amount of digital imagery captured and stored. This growth has been fueled by the advent of inexpensive digital cameras and camera-embedded mobile devices, as well as the abundance and increasing popularity of various channels for sharing images on the World Wide Web. The vast amounts of captured digital imagery and the fact that most of it comes from non-professional photographers underscores the need for effective automatic photo enhancement tools.

Indeed, virtually all existing photo management packages offer various automatic enhancement tools. However, most of these automatic approaches operate obliviously to higher-level image content and their results leave considerable room for improvement. A number of content-aware enhancement methods have been recently proposed, however the automatic methods among these mostly focus on global tone and color corrections.

SUMMARY OF THE INVENTION

The present invention, in embodiments thereof, addresses the challenges of improving known enhancement tools and provides apparatus, methods and computer readable media for addressing these challenges.

According to some embodiments, the invention provides methods for enhancing digital photographic images combining a variety of global and local tone mapping, color correction, and detail enhancement operations, while taking into account image content. In particular embodiments, in addition to global manipulation of parameters such as contrast and saturation, specific image content items (also known as "features" or "objects") are detected such as human faces, skin, blue sky and clouds, as well as underexposed parts of the scene shown in the image. Customized or "content-specific" enhancement operators are used for these content items.

In some embodiments, a method according to the invention comprises processing data representing an image. The processing comprises analyzing the data to detect one or more content items in the image to be separately enhanced; performing a content-specific enhancement operation on data representing at least one detected content item separately from the remainder of the image data, wherein the content-specific enhancement operation comprises manipulating data, and wherein the manipulation applies different adjustments to different pixels in the detected content item and the determination of the adjustments is based solely on analysis of the image data; and performing a different enhancement operation on at least the remaining image data excluding said one or more detected content items.

Thus, in preferred methods according to the invention, the content item is manipulated rather than added or removed. The manipulation is preferably based solely on analysis of the image data and does not therefore require data from external sources such as other images. Also, the adjustment is preferably pixel-by-pixel within the selected content item.

At least some of the content-specific enhancement operations to be described in the following may be used without any different enhancement of any of the remaining data. Thus, the invention also provides content-specific or customized enhancement operations to be described below.

It should be noted that, in the content enhancement operations, it is not necessarily the case that all pixels determined to be part of the content item are manipulated, or modified. In preferred methods to be described below, only certain pixels within a region of interest or content item are modified.

It will be appreciated that what constitutes "enhancement" is somewhat subjective. In the following, "enhancement operation" should be taken to refer to any operation performed on the digital data representing the image which alters the final appearance of the image.

It should also be noted that "global" in the context of this disclosure can refer to all but selected features of content items and does not, for example, necessarily refer to all of the pixels in an image.

Usually, but not necessarily, a content item will occupy a contiguous area in the image.

The adjustments applied to pixels may, for example, use multiplicative or additive factors. These factors may, in turn, depend on other parameters of the image data. The manipulation may comprise determining one or more adjustment factors for each pixel representing the content item.

There is also provided herein apparatus comprising a processor configured to implement the steps of the methods described above and in the following. The processor may notionally comprise respective modules for carrying out different parts of the process. For example, each content-specific operation may be handled in a separate module, possible separate from "global" operations. These may be performed in parallel or consecutively depending on the processes and operations being performed.

There is also provided herein a computer readable medium comprising instructions which, when implemented on a processor of a computing device, cause the device to perform any of the methods described above.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 3 shows photographs before and after adjustment for side lighting;

FIG. 7 shows photographs including sky before and after adjustment according to the process of FIG. 6;

DETAILED DESCRIPTION OF THE INVENTION

Figure 1:
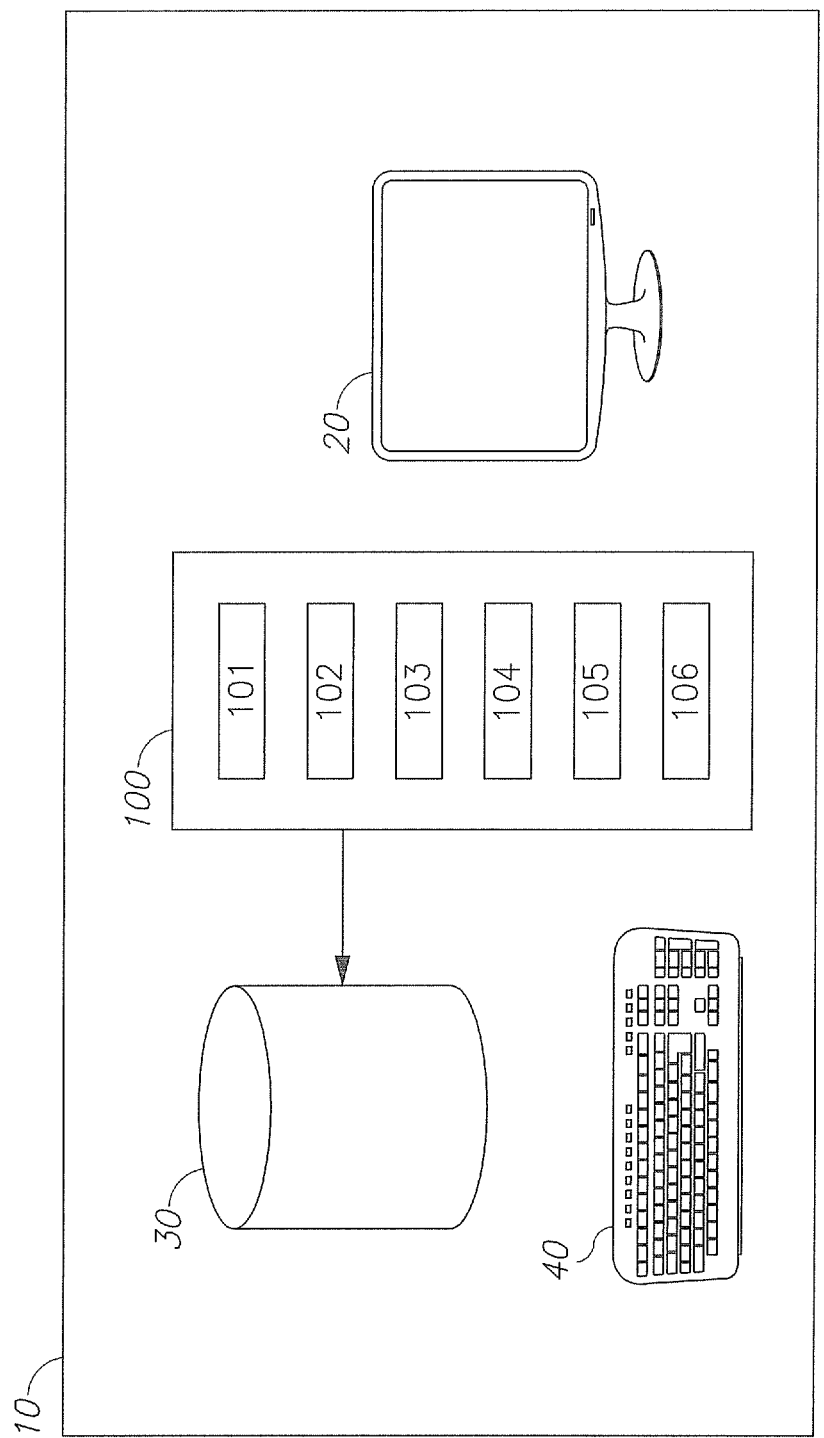
FIG. 1 is a schematic view of apparatus according to an embodiment of the invention.

With specific reference to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

In preferred methods to be described below, the analysis of data to detect one or more content items to be separately enhanced yields a subset of the data, representing a subset of pixels in the image, on which the content-specific enhancement operation is to be performed. It should be noted that these subsets may overlap.

The adjustment may be calculated to depend on the probability of the pixel being part of the content item. This is particularly helpful in dealing with the probability of overlapping regions detected to be content items. The probability dependency can lead, for example, to pixels at the outer regions of each subset being adjusted less than those in the centre thereby reducing the possibility of conflicting adjustments of overlapping regions.

Methods according to the invention may include inserting data on which an enhancement operation has been performed back into the data representing the image. This may be followed by displaying the image, further processing the image data, or simply storing the data for future display, or any other subsequent process.

In preferred methods to be described below, the analyzing of the image data may comprise using at least two different detection processes, each of which is configured to detect a different type of content item in the data. Thus, in some methods, at least two types of content item are detected during the data analysis, and a different content-specific enhancement operation is performed on each different type. For example, the types of content item could include one or more of side lit objects (especially faces), sky, and underexposed objects. Each of these types could have a different content-specific enhancement operation applied to it.

For underexposed objects, in a preferred method, the content-specific enhancement operation comprises correcting the luminance of pixels by an amount which depends on the saliency of the object. Indeed, this particular method of treating underexposed parts of images has benefits on its own. Therefore, there is also provided in the following method for enhancing a digital photographic image, the method comprising processing data representing the image, the processing comprising: determining the saliency of regions in the image and adjusting the luminance of pixels in the image by an amount which depends on the saliency and the luminance of the pixel relative to other pixels in the image.

The content specific enhancement operation in a preferred method comprises determining a luminance histogram for the pixels in the detected content item, identifying two maxima meeting predetermined criteria are present in the histogram, and adjusting the intensities of pixels in the region of the darker of the two maxima towards the brighter of the two maxima. This operation is particularly suitable for side lit content items in the image, especially but not exclusively faces.

The operation described in the foregoing paragraph may be useful on its own and therefore there is also provided in the following a method for enhancing a digital photographic image, the method comprising processing data representing the image, the processing comprising:

detecting one or more content items in the image to be separately enhanced for at least one of the detected content items:

determining a luminance histogram, identifying two maxima are present in the histogram meeting predetermined criteria, and adjusting the intensities of pixels in the region of the darker of the two maxima towards the brighter of the two maxima.

In preferred implementations of this enhancement operation, whether or not it is performed on its own, prior to determining the luminance histogram, the luminance data relating to the item is decomposed into at least a base layer and a detail layer, and the luminance histogram is based on the base layer. Then, the adjusted pixel intensity data may be combined with the detail layer.

The predetermined criteria applied to the two maxima may include any of: separation by a minimum that is at least a certain amount below the maxima; there being no other maxima above a predetermined threshold; and the maxima representing a minimum percentage of pixels in the content item or the image.

The enhancement operation may be configured such that adjusting takes place only if the two maxima are separated by a minimum that is at least a certain amount below the maxima. The amount of the adjustment may be proportional to the distance between the maxima. The adjusting is preferably such that pixel of the content item with intensity below a certain threshold is multiplied by a factor which depends on the intensity of one or both of the maxima For enhancement of sky in an image, the analyzing of the data comprises determining the probability that pixels in the image data are part of an image of sky and performing the content-specific enhancement operation on pixels having a sky probability above a predetermined threshold. Again this enhancement may be performed on its own, e.g., without any additional "global" enhancement.

The image enhancement operation for sky may comprise decomposing the pixels into blue sky and cloud components and performing one or both of: adjusting the pixels of the blue sky components towards a target blue color, and adjusting the pixels of the cloud components towards a target white colour.

The decomposition of sky may comprise determining maps representing respectively spatially varying gray level, average color, and spatially varying blue level. The adjustment may use a factor that is applied to each pixel taking into account the probability that it is part of an image of sky.

For enhancement of content items identified to be under exposed, the analyzing may comprise determining the saliency of content items in the image and detecting content items in the image that are under-exposed. The content-specific enhancement operation may then comprise adjusting the luminance of pixels in under-exposed content items by an amount dependent on the saliency of the content item. This process may also be useful on its own, e.g., without any additional global enhancement.

In certain methods, it may also be desirable to enhance details that are not part of detected content items. Therefore, one preferred method further comprises performing a detail enhancement operation on the data representing the image, the detail enhancement operation comprising:

determining the probability of the pixels not being the detected one or more content items and adjusting the luminance of each pixel by an amount that depends on the probability.

This detail enhancement may comprise decomposing the image data into a base layer and a detail layer and performing the detail enhancement operation on the detail layer. The detail enhancement is also beneficial without any content-specific enhancement operation and may be performed on its own.

In the case that the detected content items include one or more faces, for any pixel that is part of the image of a face, the amount of adjustment is inversely proportional to the size of the face.

It will be appreciated from the foregoing that the manipulation may comprise manipulating one both of tone and color of the content item in the image.

The manipulation of the data that forms part of preferred content-specific enhancement operations may be based on analysis of only the data representing the detected content item. Alternatively, additional data may be taken into account such as adjacent pixels, other content items of the same type, or the complete set of image data.

The enhancement operation performed on at least the remaining data, effectively the global enhancement, may comprise one or both of adjusting contrast and increasing saturation.

Before the embodiments of the invention are explained in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Apparatus

The method to be described below operates by applying a sequence of global and local operators to the data set representing the image. The sequence can be summarized as:

Detection
Global Contrast and Saturation Correction
Face Enhancement
Sky Enhancement
Shadowed-Saliency Enhancement
Detail and Texture Enhancement Embodiments of the invention may include some or all of these operations, or steps. They need not necessarily be carried out in the order described here.

FIG. 1 shows suitable apparatus in which the method may be implemented. The illustrated apparatus comprises a desktop computer 10. It will be appreciated that the method may be implemented in any suitable computing device of which a desktop device is merely one example. Other examples include servers which may or may not include display and user input devices, tablet computing devices, personal digital assistants (PDAs) and mobile communication devices. This does not comprise an exhaustive list of the apparatus in which the method may be implemented. It will also be appreciated that the method may be implemented in multiple computing devices rather than one, for example in a distributed system.

The computer 10 comprises memory 30 storing data representing images to be processed, either temporarily for example if the method is being provided as a remote service, or more permanently. A preliminary step of the method to be described below could be to download one or more images for enhancement from a remote source. Alternatively, they might already be present in the memory 30, for example, if the method is being implemented in a digital camera.

The computer 10 comprises processor 100 configured to process data representing the images. The processor may operate under the control of a user input device 40, which may comprise one or more of a keyboard, key pad, touch screen, cursor, joystick, scroll wheel, any device for control of a cursor and any other user input device. The foregoing is not an exhaustive list of user input devices which may be used.

The computer further comprises a display 20, such as a touch screen or LCD display. This might not be present, for example, if the method is being carried out on a server remote from the user.

The processor 100 is configured to implement the method to be described below. For this, it notionally comprises inter alia a respective module configured to carry out each of the steps. It will be appreciated that, in practice, any combination of the steps can be performed in a single module or alternatively the operation of any of the steps, since they will in practice comprise one or more sub-steps, may be distributed across more than one module.

Thus processor 100 comprises detection module 101, contrast and saturation module 102, face enhancement module 103, sky enhancement module 104, shadowed-saliency enhancement module 105 and detail and texture enhancement module 106.

Process Overview

In the following, a high level overview of each of these steps is first provided, followed by a more detailed discussion of each. As noted above, the steps are not necessarily carried out in the following order. Furthermore, they may be carried out automatically one after another, or user confirmation may be required before each step is carried out.

Figure 2:
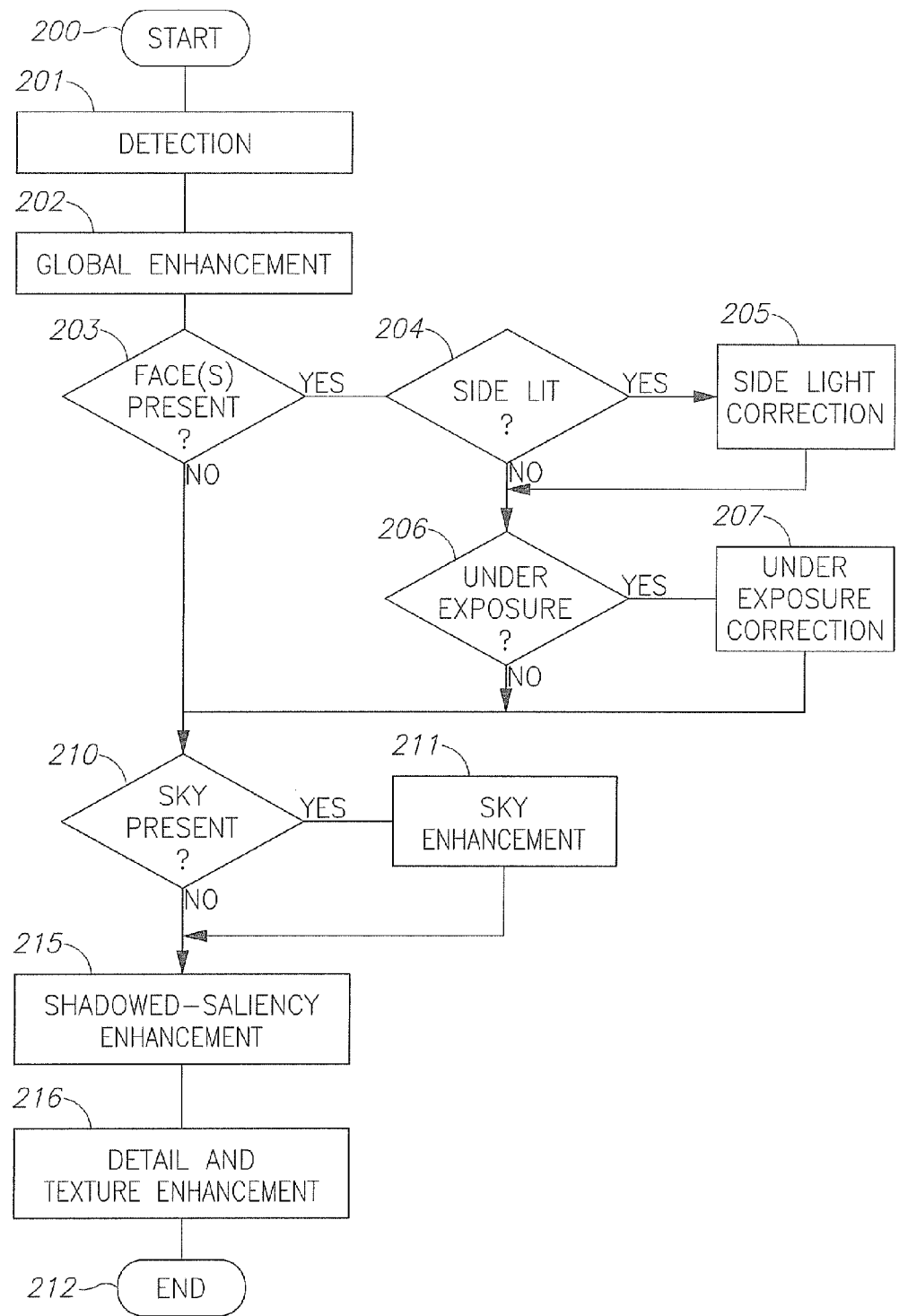
FIG. 2 is a flow chart providing an overview of a process according to the invention.

FIG. 2 is a flow chart illustrating the process at a high level. After initialization at step 200 preferably the first step 201 implemented in module 101 comprises detecting faces, skin, and sky in the input image. Standard detection algorithms are available to achieve this. In other embodiments of the invention, not illustrated in FIG. 2, content items other than skin or sky, on which enhancement operations are to be separately performed, may be detected at step 201. The results of this step are then used at various subsequent steps. The results typically comprise the identification of any of: one or more sets of pixels representing a face, usually human, one or more sets of pixels representing sky and one or more sets of pixels representing other content items in the original image to be subject to separate enhancement operations. In the preferred method, the detection step uses different detectors to detect different types of content item. Each detector may implement a different detection method. Thus, as will be explained, the method uses a different detection method for faces from the one used for sky and so one for various kinds of content item.

The second step 202 implemented in module 102 comprises global enhancement of the image by stretching the contrast and increasing the saturation. This may be conducted in a manner similar to automatic enhancement in current commercial tools (e.g., Picasa, Photoshop Elements, etc.). In one possible enhancement process, the image contrast is stretched to full range by clipping 0.5% of the darkest and the brightest pixels and increasing the saturation of each pixel by 20 percent. It is known to make the colors in an image more vivid by boosting the saturation. For example, professional products such as Adobe Lightroom or Apple Aperture provide a vibrance slider, which avoids saturating skin tones. In the presently preferred global enhancement method, content items detected in step 201, such as skin and/or sky, are excluded from this step. This may be achieved for example by excluding those pixels determined in the first, detection, step to represent part of one or more of skin, sky or another content item detected in step 201. Thus, the steps of contrast stretching and saturation increasing are preferably applied to all pixels except those that were classified as being part of a content item identified in step 201 such as skin or sky. Sky and skin and optionally any other content items detected in step 201 are treated separately in subsequent steps. It will, therefore, be appreciated that, when a step is referred to as being "global", it is not necessarily applied to the whole image and may only be applied to what remains of the image after one or more content items for separate treatment have been removed. Also, since the detected content items are treated separately, this "global" correction may take place before, after or in parallel (e.g., contemporaneously) with the treatment of the detected content items.

It should be noted that, depending on the types of content item being singled out, it may not be necessary for all of them to be excluded before global enhancement operations are carried out. Thus, it is possible that, after detection and prior to global enhancement, only certain types of detected content item are excluded from the global enhancement.

In the face enhancement implemented in module 103, the illumination of detected faces is analyzed and some common problems are corrected, or at least partially corrected. In the preferred methods, one or both of two problems are addressed: sidelit or partially shadowed faces and underexposed faces. However, it will become apparent that the techniques for achieving this to be described below are applicable also to other objects of interest, or content items, that are sidelit or underexposed and therefore these techniques are not limited to faces.

Thus, in steps 203 to 207, the results of the detection step 201 are examined to determine what type of content items are present. Different content items are treated in different ways and, unless otherwise stated below, they may be treated in any order or in parallel operations.

In the exemplary process illustrated in FIG. 2, the first step 203 following detection step 201 is to determine whether any faces are present in the image. If yes, the process continues to step 204, where it is determined whether any of the faces are sidelit. If yes, the process continues to step 205, where correction for side lighting is carried out in a manner to be described further below.

After correction for sidelighting, or if the decision at step 204 is negative, a determination is made as to whether there is any underexposure of a face at step 206. In the affirmative, underexposure correction is carried out at step 207. Otherwise, the process continues to step 208. Step 206 is optional, and, instead of determining whether over exposure is necessary, correction for underexposure may be carried out automatically as in the detailed method to be described below, to greater or lesser effect depending on the extent to which it was necessary.

In an alternative embodiment of the method of FIG. 2, the underexposure correction may be carried out before the sidelighting correction. Also, as noted above, the correction for underexposure and sidelighting may be applied to objects or content items in the image other than faces.

FIG. 3 shows the results of face enhancement operations. FIG. 3a shows on the left an image of a sidelit face prior to enhancement and on the right the same image after the enhancement to be described further below. FIG. 3b shows on the left an image an image of an underexposed face prior to enhancement and on the right the same image after correction to be described below.

In module 104, sky enhancement is performed. In the exemplary process shown in FIG. 2, this is carried out after any face enhancement. However, since sky is treated separately from faces, the determination as to whether any sky pixels are present and subsequent sky enhancement may take place before face enhancement or parallel with face enhancement.

In step 210 of FIG. 2, a determination is made as to whether any sky pixels are present in the image. There are a number of known techniques for this. If sky is present, the process continues to step 211 where sky enhancement is performed. The sky enhancement to be described further herein applies to blue skies with or without clouds. An assumption is made that each sky pixel is a linear combination of a blue color with a gray cloud color. The two colors are separated at each pixel and each component is processed separately. The sky component is adjusted toward a more attractive shade of blue, while the cloud component is adjusted towards white.

If it is determined at step 210 that no sky is present, the process continues to step 215 implemented in module 105 where "shadowed-saliency enhancement" is optionally carried out. Many images contain dark, underexposed regions, which might be visually important. Indiscriminately brightening such regions results in an undesirable global contrast reduction, and, therefore, our next step attempts to only improve the visibility of the salient details, if resent in underexposed image, while preserving the brightness of other regions. A salience map is computed, and the exposure of each underexposed region is increased proportionally to its estimated salience.

The process continues to step 216 implemented in module 106 where detail and texture enhancement is optionally carried out. The perceived visual quality of an image is typically improved by slightly boosting fine scale detail and texture. Thus, the final step of the process performs such boosting using an edge-preserving decomposition of the image. Details are boosted in a selective, spatially varying manner, excluding image regions that could be visually harmed by this operation.

The process ends at step 217. The processes of Face Enhancement, Sky Enhancement Shadowed-Saliency Enhancement, and Detail and Texture Enhancement will now be described in more detail.

Face Enhancement

Faces are detected during the preprocessing stage (step 201, FIG. 2). The face detection may be carried out as follows: To cope with differently exposed faces, the lighting in the image is preferably first normalized. Suitable normalization techniques will be familiar to those skilled in the art. Then, a boundary is produced for each face. One technique for doing this produces a bounding rectangle for each detected face. The normalization is carried out only to assist the face detection and preferably is not used afterwards.

The subsequent face enhancement process is described in more detail with reference to FIG. 4.

Following initialization at step 401, acquisition or receiving an image at step 402 and acquisition of face boundary at step 403 as described above, a "skin probability map" is computed at step 404. This probability map estimates the probability of a pixel belonging in a skin region based on its color. The skin map computation is based on the published observation that human skin has a restricted range of hue values. This is due to the fact that it is created by a combination of red (blood) and yellow-brown (melanin). Therefore, human skin colors tend to cluster in a relatively small region of the colorspace. This colorspace region is detected and defined. Each pixel in this colorspace region is then assigned a skin probability based on the distance of the pixel's color from this region (e.g., in CIELAB color space). Skin-patches that are too small are discarded, as are noise and connected-components too small for any significant processing. The remaining patches are expanded for identifying skin pixels that may have been given a lower probability value due to noise.

In an exemplary process for determining whether a pixel is skin or not, about 300,000 skin patches of size 5×5 were extracted from a variety of images and the mean of their A and B channels was calculated (in CIELAB). Most skin patch colors fall within an ellipse-shaped region of the AB plane. The ellipse fitted to this region was given by:

$$\left(\frac{A-143}{6.5}\right)^2 + \left(\frac{B-148}{12}\right)^2 < 1$$

Colors outside this ellipse were assigned skin probability that decreases proportionally with distance from the ellipse. This "ellipse test" was further refined by thresholding again in the HSV domain. The threshold found in this color space is not tight, so it may not be sufficient by itself but it discarded some of the non-skin pixels that passed the "ellipse test". Next pixels that have a saturation value outside the range:

$0:25 \leq s \geq 0:75$, or a hue value larger than 0.095 were discarded. To avoid too many holes in the detected skin regions (due to noise and other artifacts in the color), the process also examined the colors falling within the same ellipse after expanding it by a factor of 1.25. Patches in the image with color falling between the two ellipses were also classified as skin, but only if adjacent to skin pixels that passed the previous, more conservative test.

It will be appreciated that the flow charts which form part of the figures are simply examples of the order in which parts of the image enhancement process may be carried out. Thus, it may be considered that the formation of the skin probability map is part of the detection process or part of the process of determining whether a face is present in the image.

Figure 4:
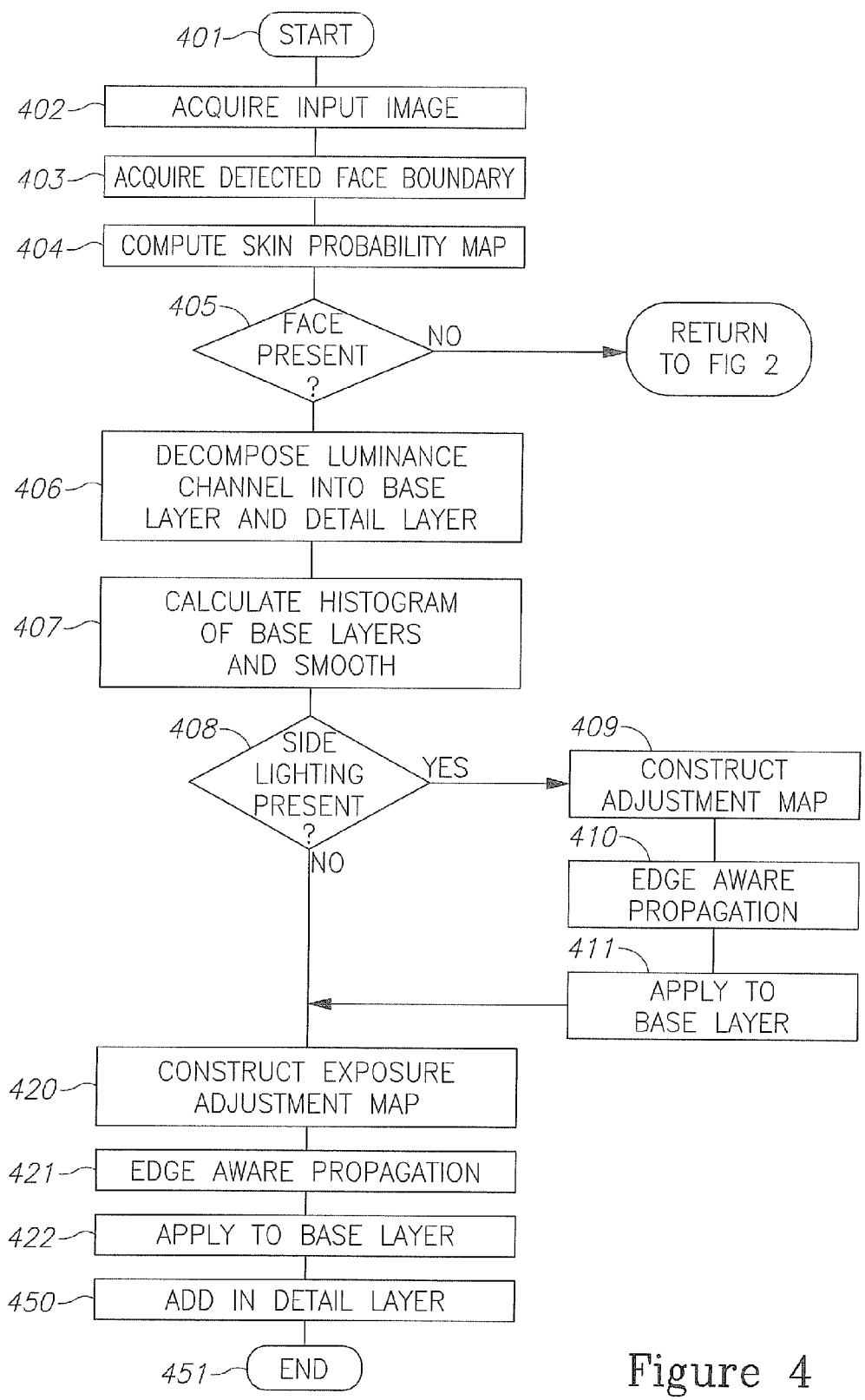
FIG. 4 is a flow chart illustrating in more detail a process of adjustment for side lighting.

Thus, in the exemplary flow of FIG. 4, decision is made at step 405 whether a face is present. If not, the process returns to step 210 of FIG. 2. If a face is present, the process continues to step 406 where the face enhancement commences.

In the particular method for face enhancement to be described below, the faces detected earlier are locally corrected, performing two possible corrections:

Sidelight correction: reduce the contrast across faces that are partially brightly lit and partially shadowed.

Exposure correction: brighten up underexposed faces.

Also possible at this stage, but not described in detail herein, is skin tone correction to correct faces towards more natural skin tones.

Since a face may be both sidelit and underexposed, it may be desirable to apply both corrections. In this case, it is preferred that but not essential that they are applied in the order listed above.

Sidelight and exposure corrections may be essentially local tone mapping operators that manipulate the luminance of faces. At step 406, a weighted least squares (WLS) filter is used to decompose the monochromatic luminance channel for the data into a base layer and a detail layer. This is performed on the face data, e.g., the pixels within the boundary identified in step 403 or preferably those identified from the skin probability map to be skin pixels. The base layer is assumed to capture the illumination of the face. Thus, both the sidelight and the exposure correction operate on the base layer, as described below.

A sidelit face is characterized by a bimodal luminance histogram where one mode comes from the shadowed pixels in the face and the other from the brightly lit ones. Thus, at step 407 the luminance histogram is computed for the skin pixels in the base layer inside the face's bounding rectangle and smoothed. The histogram is then examined for local maxima at step 408 to determine whether two modes are present which would indicate the presence of side-lighting for which correction is desirable. In a particular embodiment, local maxima are examined to find any that exceed a certain threshold e.g. a percentage, e.g., at least 5% of the face pixels. If two such peaks are found, with a minimum between them meeting one or more criteria, these peaks may be identified as dark and bright modes indicating side lighting that would benefit from correction. A suitable criterion is that the minimum between them is at least 20 percent lower than each of the peaks. If a bimodal structure is not detected, it is determined that there is no side-lighting that needs correction. The face is not modified by this operator and the process continues to exposure correction to be described below.

The determination at step 408 may include sub steps as follows: if there are two such points (maxima with at least e.g. 5% of face pixels) without some intensities between them that have at least 20% (or some other suitable percentage) less pixels than they do, it can be deduced that they both are part of the same mode. Then, the less populated value can be dismissed. This process may be continued either until only one such maxima is left (in which case it is determined that the face is not sidelit), or the process stops and at least two modes have been found. In this case the darkest and brightest modes are selected for the next step. The intensity of the minimal value of the smoothed histogram between these two modes is m.

Figure 5:
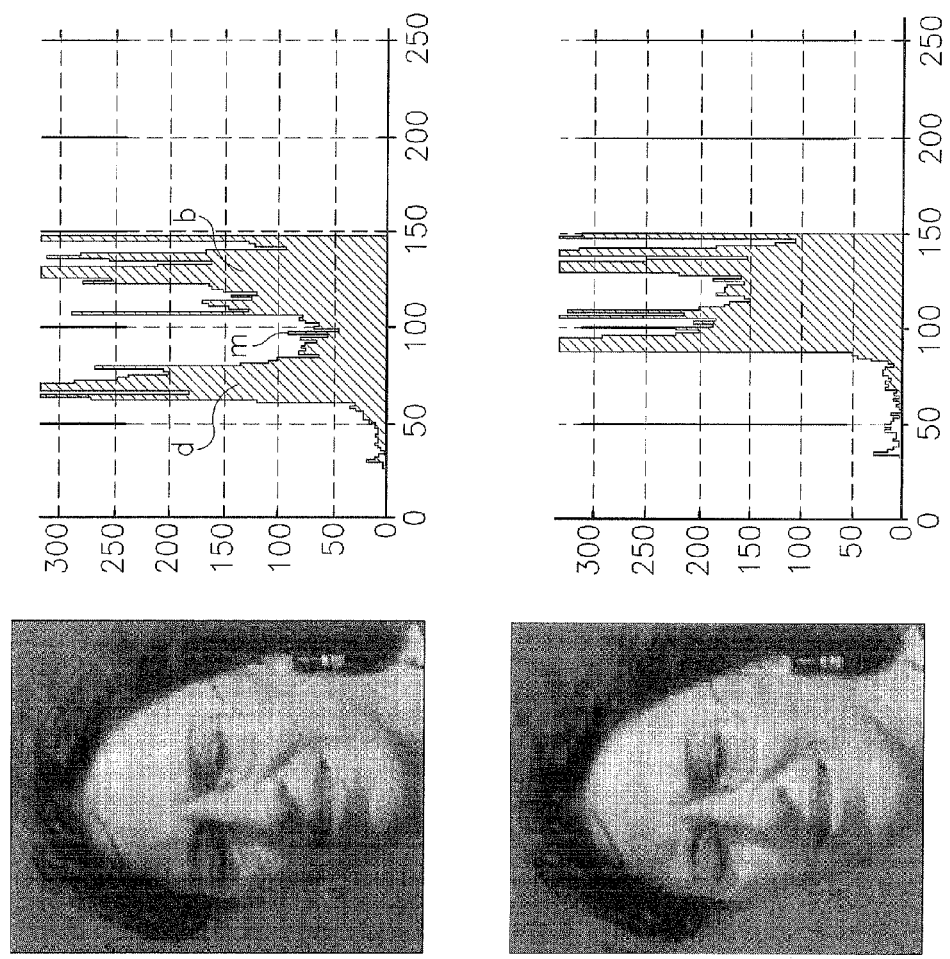
FIG. 5 shows photographs of a face before and after adjustment for side-lighting, together with their corresponding luminance histograms.

FIG. 5 shows photographs of a face before and after adjustment for side-lighting, together with their corresponding luminance histograms.

Having found the two modes, the dark mode is pulled towards the bright mode in proportion to the distance between the two modes or maxima. This may be done as follows: Let d and b denote the intensities of the dark and bright modes, and m denote the intensity at the minimum between them as shown in FIG. 5. A multiplicative adjustment map A is constructed at step 409 where every skin pixel inside the face with intensity below m is multiplied by $f=(b-d)/(m-d)$. Then, the map may be smoothed, for example using edge-aware constraint propagation, to smooth A at step 410. The resulting adjustment map is then applied to the base layer at step 411. Note that smoothing the map with edge-aware constraint propagation is instrumental for applying the changes in a piecewise smooth fashion to the entire face, while avoiding visible boundaries between modified and unmodified regions. Other suitable smoothing techniques may be used.

It is important to note that, in the preferred method of sidelight adjustment just described, the structure of the luminance histogram inside the detected facial region is analyzed rather than just considering its range, peak, and median. Then, only certain pixels in the region of interest are modified, while others remain unchanged.

As noted above, this method of correction for side-lighting is applicable not only to faces but also to other detailed objects which are side-lit. Thus, in step 203, other features could be identified for subsequent analysis to determine whether they are sidelit, in which case they may be corrected in the same way.

The moving of the dark mode towards the bright mode reduces the overall contrast across the face. However, it increases the illumination in the shadowed region, leaving the brighter region unchanged. This has been found to typically produce better results than moving the brighter region as well.

After sidelight correction, it still may be desirable to correct the overall exposure of the face to ensure satisfactory brightness and visibility. Thus, the second stage of the face enhancement, exposure correction, is carried out in steps 420, 421 and 422. The exposure correction is achieved by multiplying the luminance of each face skin pixel by a factor calculated to shift the luminance towards a selected percentile. As with other aspects of this method, it is applicable to other objects as well as faces.

After statistics were gathered from 400 well-exposed faces, it was found that the average luminance of facial pixels is around 110 (out of 255), and the 75th percentile corresponds to a luminance of roughly 120 (out of 255). Therefore, in one method for exposure correction applicable in this method, the exposure may be adjusted by multiplying all the face pixels by a factor so that the 75th percentile shifts halfway towards 120. This has been empirically found to produce better results than shifting all the way to 120, which may change the picture too much. For other objects, a different percentile and a different luminance figure may be chosen. The luminance value will typically be around half of the maximum possible luminance of the system.

Thus, in step 420, following any desired side-lighting correction, a further adjustment map is constructed where every face skin pixel is multiplied by a factor calculated to shift the luminance towards a selected percentile. Edge-aware propagation is performed as before at step 421, and this is applied to the base layer in step 422.

In order to prevent correction of well-exposed faces and avoid visual artifacts due to an overly aggressive exposure correction, the correction factor is preferably bounded. In this example, it is bounded to be between 1 and 2. This also prevents excessive brightening of dark-skinned faces.

Finally, the detail layer is added back in and the color is restored, as typically done in known tone mapping algorithms. This is done at step 450, following which face enhancement ends at step 451.

Figure 6:
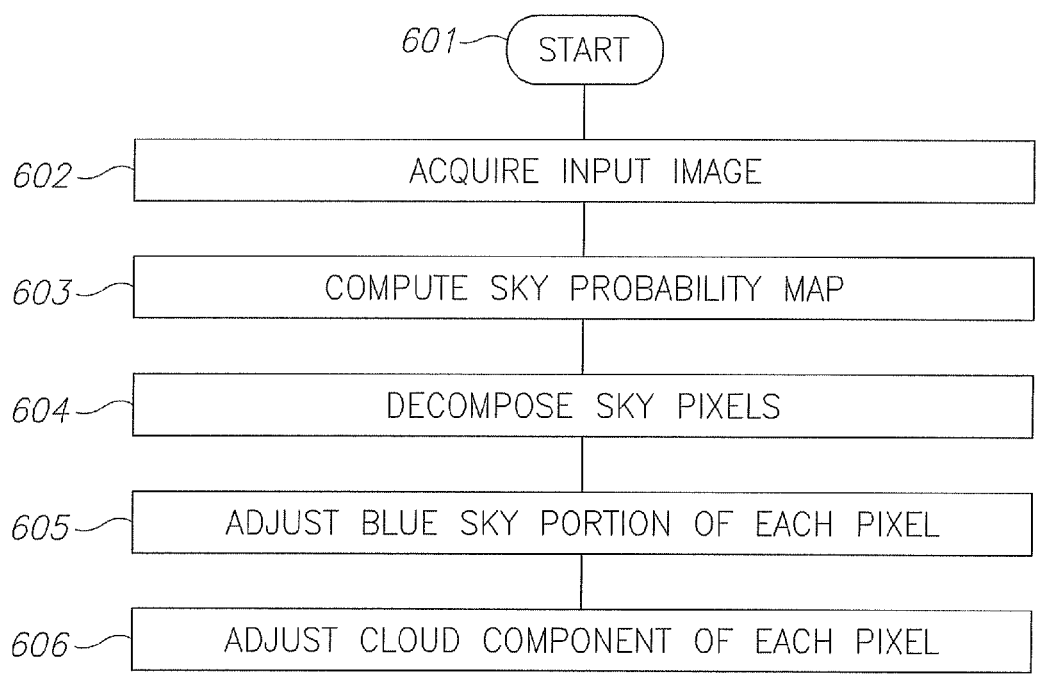
FIG. 6 is a flow chart illustrating in more detail a process of adjustment for enhancing images of sky.

Below is an exemplary algorithm for the entire face correction process:

---
Algorithm 1 CorrectFace(I; F; $M_{skin}$)
---
Require: I - input image (luminance channel).
Require: F - detected face rectangle.
Require: $M^{skin}$ - skin mask.
Ensure: $I^{out}$ - adjusted image (luminance channel).
1: // Perform edge-preserving base/detail decomposition
2: (Base;Detail) =WLSFilter(I)
3: $I^{out}$ = Base
4: // Sidelight correction ---
Algorithm 1 CorrectFace(I; F; $M_{skin}$)
---
5: S = F ∩ $M^{skin}$                                // skin pixels inside F
6: H = Smoothed histogram of intensities in $I^{out}$ [S]
7: if H is bimodal (sidelit face) then
8:    d = intensity of dark mode in H
9:    b = intensity of bright mode in H
10:   m = intensity at local minimum between d and b
11:   f = b–d / m–d
12:   I = adjustment map scaling by I every pixel∈ S with intensity ≤m
13:   Apply edge-aware constraint propagation to A
14:   $I^{out}$ = $I^{out}$ . A              // pixelwise multiplication
15: end if
16: // Exposure Correction
17: p = 75th percentile of face skin pixels S
18: if p < 120 (underexposed face) then
19:   f = (120+p )/2p ; ensure 1 ≤ f ≤ 2
20:   A = adjustment map scaling by f every pixel∈ S
21:   Apply edge-aware constraint propagation to A
22:   $I^{out}$ = $I^{out}$ _A              // pixelwise multiplication
23: end if
24: Iout+ = Detail                           // restore detail Sky Enhancement A suitable process for carrying out sky enhancement will now be described with reference to FIG. 6. The process for determining whether sky is present in an image, may be carried out in a number of ways and may be considered to be part of the detection of content items or the determination as to whether certain content items or types of content item are present.

In the method described here, following initialization at step 601 and the acquisition of the image data at step 602, a sky probability map is computed at step 603. This determines the probability of each pixel belong to regions in the image containing sky and clouds. This process takes into account any or all of various factors, including the pixels' smoothness, color, and positions. One suitable method found suitable for sky detection is now described further.

The sky enhancement is most suitable for non-sunset skies, as will become clear below, and therefore it can be assumed that the sky has a blue hue. The color, position and shape of the different regions in the image are analyzed in order to determine where the sky is (and if it is present at all). A sky probability map is then created for each pixel.

The mean color of a "nicelooking" blue sky is established. This may be done for example by examining professional manually enhanced photos containing sky, as well as its variance in each color channel. This yields an "ideal blue range". This range is used to initially detect a large sky reference patch in the input image.

Next, the more specific color statistics of this reference patch may be used to find the rest of the sky pixels in this image by requiring them to be in a color range that is set according to the mean and variance of the reference patch. Thus, any pixel outside the ideal blue range is assigned a sky probability of zero, while pixels inside that range are assigned probability of one. Next, the resulting binary map is refined by keeping a probability of one for pixels with small gradients (under a certain threshold e.g. 5% change), and assigning an exponentially-decreasing probability for blue pixels with larger gradients.

In many landscape images, the sky patches detected as described above also capture distant objects, due to attenuation and color cast caused by the atmosphere. This case may be handled by detecting a bimodal structure in the luminance histogram of detected sky patches, and excluding pixels that correspond to the darker mode, if present.

It can be assumed that, if the sky is present in an image, at least some part of it is located in the top third of the image, and an image can be classified as skyless if no such patch is found. Otherwise, the largest connected component in the top third of the image that passed the tests so far may be designated as the sky reference patch. The mean and the variance inside this patch may be determined and used to assign each of the other sky candidate pixels a probability (assuming normal distribution).

At this stage, a sky probability map that contains blue sky pixels, as well as some of the clouds, is derived. This map may be expanded by adding to it all of the gray-colored patches that are adjacent to high-probability sky pixels. This is the final map that may then be used in the sky enhancement.

Recall from the above that the largest connected sky region in the image is also detected as part of the process. This is referred to below as the sky reference patch.

In the sky enhancement, each high probability sky pixel, e.g., each pixel with a probability above a certain threshold and/or meeting certain other requirements, is decomposed at step 604 into a blue sky component and a gray cloud component. The goal is to change the sky color to a "nicer" shade of blue and make the clouds whiter and "cleaner". It should be noted that the method preferably enhances only blue skies, not sunset ones, since it would not usually be desirable to turn a colorful sunset sky into a blue one. Since the sky detection method is designed to only detect blue skies, the sky pixels in sunset photos that are not determined to be blue will not be detected (i.e., determined to be sky), and if no pixels are determined to be sky the sky enhancement will not take place.

To decompose each sky pixel into its blue sky and grey cloud components, the following simple image formation model may be assumed:

$$p_i = \alpha_i \cdot \underbrace{c_i \cdot (1, 1, 1)^T}_{Cloud} + (1 - \alpha_i) \cdot \underbrace{s_i \cdot (S_R, S_G, S_B)^T}_{Sky} \quad (1)$$

where $S=(S_R;S_G;S_B)$ is the average color of the sky reference patch, $c_i$ accounts for the spatially varying gray level of the cloud, $\alpha_i$ is the "cloud coverage" of pixel i, and $s_i$ is the spatially varying blue sky intensity.

It is desirable to recover the three maps $(\alpha; c; s)$, which can be found by minimizing:

$$J(\alpha, c, s) = \sum_i (D(\alpha_i, c_i, s_i) + \lambda R(s_i)) \quad (2)$$

where the data term D and the regularization term R are defined independently at each sky pixel $p_i=(r_i, g_i, b_i)$ as:

$$R(s_i) = (s_i - 1)^2 \quad (3)$$

$$D(\alpha_i, c_i, s_i) = \left( \left\| \alpha_i c_i \begin{bmatrix} 1 \\ 1 \\ 1 \end{bmatrix} + (1-\alpha_i)s_i \right. \\ \left. \begin{bmatrix} S_R \\ S_G \\ S_B \end{bmatrix} - \begin{bmatrix} r_i \\ g_i \\ b_i \end{bmatrix} \right\|^2 \right)$$

The R term ensures that the clear sky color does not deviate much from S, while the D term attempts to satisfy the formation model (1). Having obtained the sky/cloud decomposition, sky enhancement may now be performed. For this, a suitable blue color may be chosen for the basis of the enhancement. This may, for example, be chosen from professional manually-enhanced photographs with blue skies. A blue (e.g., bright) target color is then obtained. The blue sky portion of each sky pixel may be adjusted towards this target color. This is done at step 605 in the flow of FIG. 6.

In one possible process, this may be done by computing a multiplicative correction factor f sky=(fL; fA; fB) as the channel-wise ratio (in CIELAB color space) between the target color and the average sky reference patch color. This correction is then carried out for each pixel i taking into account its sky probability $P^{sky}_i$.

The cloud component of each sky pixel may be adjusted towards white in step 606. One possible way of doing this is as follows:

Let $\beta_i^{old}$ denote the extracted blue sky color $s_i(S_R;S_G;S_B)$ converted to the CIELAB color space, and $k_i^{old}$ the extracted gray cloud color $(c_i;c_i;c_i)$ (also in CIELAB). These two colors may be adjusted separately:

$$\beta_i^{new} = P_i^{sky} f^{sky} \cdot \beta_i^{old} + (1 - P_i^{sky})\beta_i^{old} \quad (4)$$

$$\kappa_i^{new} = P_i^{sky} \frac{W + \kappa_i^{old}}{2} + (1 - P_i^{sky})\kappa_i^{old} \quad (5)$$

Here W is the reference white of CIELAB (100;0;0). The new colors are converted back to RGB where they are recombined using $\alpha_i$.

FIG. 7 shows examples of results obtained by the sky enhancement alone.

Shadowed-Saliency Enhancement

Figure 8:
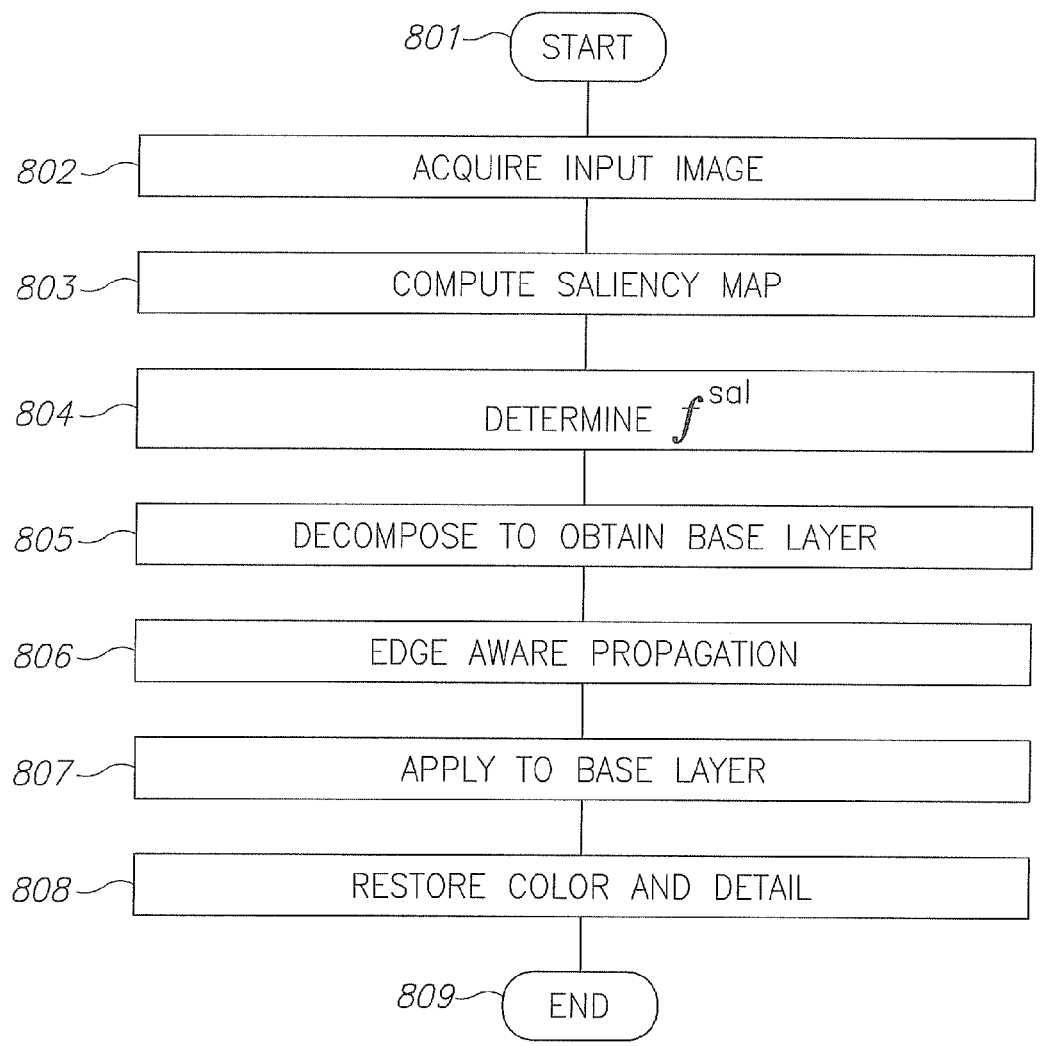
FIG. 8 is a flow chart illustrating in more detail a process of adjustment for enhancing shadowed salient features in an image.

In many photographs, parts of the scene appear darker than intended by the photographer. The goal of this part of the process, shown in FIG. 8, is to increase the visibility of the details in salient regions of the image, while attempting to preserve global brightness relationships. In the following exemplary process, this is done locally by increasing the exposure of underexposed regions proportionally to their estimated saliency. The exposure correction is bounded to avoid making shadowed objects appear too bright.

The process is similar to the earlier described processes in that a correction factor is applied to each of a selection of pixels, preferably to the luminance values. Thus, it may be useful although not described below to compute an adjustment map which is then smoothed before being applied to the image data, e.g., an extracted base layer as with face correction.

Referring to FIG. 8, the process is initialized and the image data is acquired in steps 801 and 802. Next a saliency map is computed or obtained, e.g., if it has already been computed for another part of the image processing, in step 803.

The process is preferably designed to avoid increasing the brightness of all shadowed regions indiscriminately. However, this may lead to a smaller risk of reducing the global contrast in the image. There are many methods for estimating the salience of image regions. The preferred one for the process to be described is based on an energy map. This technique combines a number of cues:

1. Grayscale gradient magnitude.
2. Color gradient magnitude (using the A,B components of CIELAB)
3. Color histogram: the rarer the color the higher the saliency. (Again, using the A,B components.)

4. Skin pixels are assigned higher saliency.
5. Distance from center.

To complete the computation of the saliency map, edge preserving propagation is applied using the edges of the original image. This may be done at any stage before the pixel luminance values are adjusted.

After determination of saliency, at step 804 a determination is made as to how much to correct each underexposed region. For this, the luminance channel is preferably split into two parts: DARK, which includes all pixels in the image that have a value below 50 (out of 255), and BRIGHT, which includes all the other pixels.

$$A \text{ factor of } f^{sal} = \min\left\{2, \frac{PT(\text{BRIGHT}, 35\%)}{PT(\text{DARK}, 95\%)}\right\}$$

is then used for multiplying the luminance of each pixel, where $PT(A;b)$ is the $b^{th}$ percentile of A's values. Bounding the factor, e.g., by 2, is desirable to prevent unnatural brightening. Additionally, pixels under a low threshold are preferably not changed to prevent black pixels becoming gray.

To perform the correction, WLS filter is again applied on the luminance channel at step 805 to obtain an edge-preserving base detail decomposition at step 806.

Let $M^{sal}_i$ denote the saliency of pixel i, and $B_i$ its base layer luminance before the correction. At step 807 for each pixel in the DARK set a corrected base layer luminance $B^{new}_i$ is computed as follows:

$$B^{new}_i = f^{sal} M^{sal}_i B + (1 - M^{sal}_i) Bi \qquad (6)$$

The detail layer and color are then restored at step 808, and the process ends at step 809. Note that the salient areas which are not underexposed are not affected.

Detail and Texture Enhancement

Photographs often benefit from a moderate amount of detail enhancement. Thus, the final stage of the complete process shown in FIG. 9 boosts the fine details and textures in the image. This accounts for image content, since boosting fine details globally without accounting for image content can increase noise in the sky or emphasize skin blemishes.

Also, preferably a distinction is made between images that have an identifiable focus of interest and those that do not. An assumption is preferably made that faces in images constitute a focus of interest proportionally to their size—the larger the face is, the less it is desirable to distract the viewer's attention from it. Thus, apart from avoiding detail boosting in sky and skin regions, the degree of boosting in images that contain large faces is preferably attenuated, e.g., proportionally to the largest face size. One method of doing this is as follows:

Let $P^{ns}$ be a map that gives the probability of a pixel not being sky or skin, L the log-luminance of the image, and D the detail layer extracted from L using the WLS filter. A detail-enhanced log-luminance image is obtained as $$L\text{new} = L + c P^{ns} \cdot D \qquad (7)$$

where $Pns \cdot D$ is a pixelwise product. The factor $c \in [0;0.25]$ determines the amount of detail boosting to be given to the image. c is bounded from above by 0.25 to avoid unnatural exaggerated details, and its magnitude is inversely proportional to the size of the detected faces (when faces cover more than a quarter of the image c becomes 0).

Figure 9:
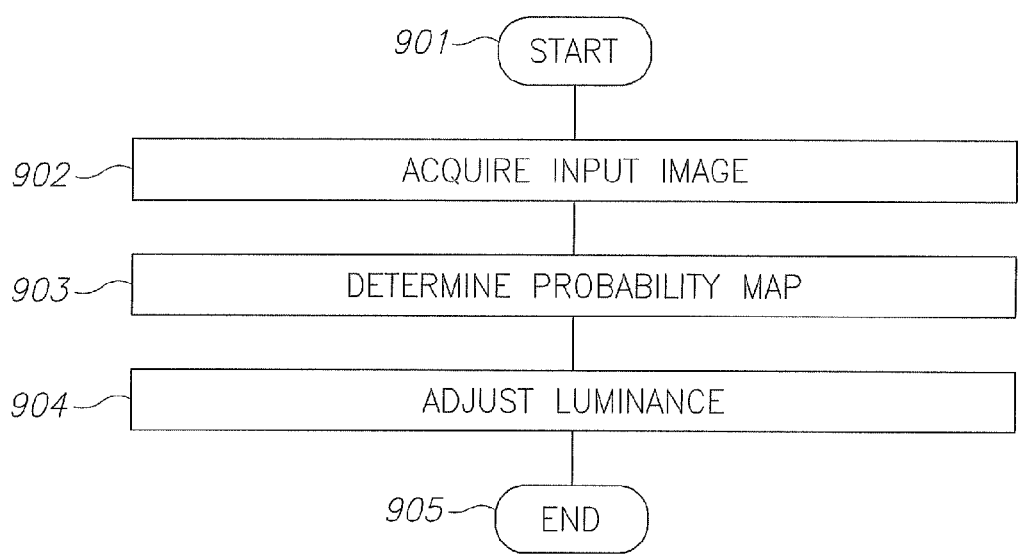
FIG. 9 is a flow chart illustrating in more detail a process of detail and texture enhancement.

Thus, referring to FIG. 9, a process for detail enhancement may comprise initialization at step 901, acquiring the input image at step 902, determining the probability map at step 903 that a pixel is not sky or skin and adjusting the luminance at step 904 according to equation (7) above before the process ends at step 905.

More generally, the probability determined at step 903 could indicate the probability that a pixel is not any of the content items or types of content item that are detected for separate enhancement, or it could determine the probability that a pixel is not one of a subset of types of content item that are detected for separate enhancement.

Results

Studies have been conducted in which individuals were asked to state their preferences between images produced by the above method compared to the original input image and images produced by other known methods. A high proportion of those taking part expressed a preference for the method described above. It is noteworthy that even with images containing neither faces nor sky, the foregoing method was still preferred more often. This can be attributed to the use of the shadowed-saliency enhancement as well as the detail enhancement. Both of these enhancements are in effect content-aware local operators. They apply to all images regardless of presence of faces and/or skies. However, their effect tends to be more subtle because they are applied rather conservatively to reduce the risk of introducing unnatural artifacts.

The foregoing describes an automatic photo enhancement framework that combines several tone mapping and color correction algorithms in a single pipeline or flow, applied in a selective manner driven by the specific content detected in the image. This framework is modular and can be adapted to include other content items than those specifically described above. Examples include vegetation and water. Other possible modifications that are presently foreseen include the use of alternative methods to the weighted least squares method for the decomposition of the image. One possibility uses edge-avoiding wavelets.

The process could be personalised. For example this could be achieved by a user inputting preferences, e.g., as to amount of adjustment, or by a system learning the preferences of individual users with respect to any of global saturation, exposure of faces, skin tones, and sky color, and use these learned parameters instead of those suggested above.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of one or more inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for enhancing a digital photographic image, the method comprising processing data representing the image, the processing comprising:
    analysing the data to detect one or more content items in the image to be separately enhanced;
    performing a content-specific enhancement operation on data representing at least one detected content item separately from the remainder of the image data, wherein the content-specific enhancement operation comprises manipulating data, and wherein the manipulation applies different adjustments to different pixels in the detected content item and the determination of the adjustments is based solely on analysis of the image data; and
    performing a different enhancement operation on at least the remaining image data excluding said one or more detected content items.

2. The method of claim 1 wherein the adjustment is calculated to depend on the probability of the pixel being part of the content item.

3. The method of claim 1 wherein the analysing comprises using at least two different detection processes each of which is configured to detect a different type of content item in the data representing the image.

4. The method of claim 3 wherein at least two different types of content item are detected during said analysing and wherein said performing a content-specific comprising performing a different content-specific enhancement operation on each of said different types of content item.

5. The method of claim 1 wherein during the content-specific enhancement operation adjustments are applied to only certain pixels forming part of a content item.

6. The method of claim 3 wherein the types of content item include one or more of: side lit objects, sky, water, vegetation, and under exposed objects.

7. The method of claim 1 wherein the analysing comprises detecting under-exposed objects in the image and the content-specific enhancement operation comprises adjusting the luminance of pixels by an amount which depends on the saliency of the object.

8. The method of claim 1 wherein the manipulation is based on analysis of only the data representing the detected content item.

9. The method of claim 1 wherein the content-specific enhancement operation comprises:
    determining a luminance histogram for the pixels in the detected content item,
    identifying two maxima meeting predetermined criteria are present in the histogram, and adjusting the intensities of pixels in the region of the darker of the two maxima towards the brighter of the two maxima.

10. The method of claim 9 comprising decomposing luminance data for the content item into a base layer and a detail layer and wherein the adjustment is applied to the luminance values of the detail layer.

11. The method of claim 1 wherein the content-specific enhancement operation comprises:
    multiplying the luminance of each pixel in the content item by a factor calculated to shift the luminance towards a selected percentile.

12. The method of claim 1 in which the analysing comprises determining the probability that pixels in the image data are part of an image of sky and performing the content-specific enhancement operation on pixels having a sky probability above a predetermined threshold.

13. The method of claim 12 in which the image enhancement operation comprises identifying one or both of blue sky components and cloud components among the pixels having a sky probability above a predetermined threshold and performing one or both of:
    adjusting pixels of blue sky components towards a target blue color, and
    adjusting pixels of cloud components towards a target white colour.

14. The method of claim 1 wherein the analysing comprises determining the saliency of content items in the image and detecting content items in the image that are under-exposed, and the performing a content-specific enhancement operation comprises adjusting the luminance of pixels in under-exposed content items by an amount dependent on the saliency of the content item.

15. The method of claim 1 further comprising performing a detail enhancement operation on the data representing the image, the detail enhancement operation comprising:
    determining the probability of the pixels not being the detected one or more content items and
    adjusting the luminance of each pixel by an amount that depends on the probability.

16. A method for enhancing a digital photographic image, the method comprising processing data representing the image, the processing comprising:
    using at least two different detection processes to detect one or more content items in the image to be separately enhanced, each detection process being configured to detect a different type of content item in the data representing the image;
    for each detected content item performing a content-specific enhancement operation on data representing the content item separately from the remainder of the image data, wherein the content-specific enhancement operation comprises manipulating data, and wherein the manipulation applies different adjustments to different pixels in the detected content item and the determination of the adjustments is based solely on analysis of the image data.

17. The method of claim 16 further comprising performing a different enhancement operation on at least the remaining image data excluding said one or more detected content items.

18. Apparatus for enhancing a digital photographic image comprising data store and a processor, the processor being configured to:
    receive data representing the image from the data store,
    analyze the data to detect one or more content items in the image to be separately enhanced;
    perform a content-specific enhancement operation on data representing at least one detected content item separately from the remainder of the image data, wherein the content-specific enhancement operation comprises manipulating data, and wherein the manipulation applies different adjustments to different pixels in the detected content item and the determination of the adjustments is based solely on analysis of the image data; and
    perform a different enhancement operation on at least the remaining image data excluding said one or more detected content items.

19. A computer program product comprising a non-transitory computer readable storage medium having computer readable program embodied therewith, the computer readable program comprising:
    computer readable program configured to receive data representing the image from the data store;
    computer readable program configured to analyse the data to detect one or more content items in the image to be separately enhanced;
    computer readable program configured to perform a content-specific enhancement operation on data representing at least one detected content item separately from the remainder of the image data, wherein the content-specific enhancement operation comprises manipulating data, and wherein the manipulation applies different adjustments to different pixels in the detected content item and the determination of the adjustments is based solely on analysis of the image data; and
    computer readable program configured to perform a different enhancement operation on at least the remaining image data excluding said one or more detected content items.

* * * * *